United States Patent [19]
Dewell

[11] 3,806,583
[45] Apr. 23, 1974

[54] RECOVERY OF RADIOACTIVE NOBLE GASES FROM GASEOUS EFFLUENTS

[75] Inventor: Edgar H. Dewell, Lynchburg, Va.

[73] Assignee: The Babcock & Wilcox Company, New York, N.Y.

[22] Filed: Mar. 15, 1971

[21] Appl. No.: 124,383

[52] U.S. Cl.................. 423/262, 23/260, 55/66, 423/210
[51] Int. Cl............................................. C01b 23/00
[58] Field of Search............ 23/209, 25, 260; 55/16, 55/66; 423/211, 262, 210

[56] References Cited
UNITED STATES PATENTS

| | | | |
|---|---|---|---|
| 2,795,482 | 6/1957 | McNabney | 23/216 X |
| 3,247,648 | 4/1966 | McKinley | 55/16 |
| 3,467,493 | 9/1969 | Eguchi et al. | 23/25 |

FOREIGN PATENTS OR APPLICATIONS

| 961,925 | 6/1964 | Great Britain | 55/66 |
|---|---|---|---|

OTHER PUBLICATIONS

D. S. Gibbs et al.; "Purification of the Rare Gases;" Industrial & Engineering Chem.; V. 48; Feb., 1956; p. 289–296.

Primary Examiner—Edward J. Meros
Attorney, Agent, or Firm—J. M. Maquire, Esq.; J. P. Sinnott, Esq.

[57] ABSTRACT

A process of combating environmental pollution by separating and recovering radioactive noble gases such as xenon and krypton in a substantially pure state from the gaseous effluents of a nuclear power station. In the process, the gaseous effluents are initially dehalogenated and devaporized followed, in sequence, by the dehydrogenation and subsequent removal of residual gaseous contaminants from such effluents leaving the rare gases in substantially pure form for recovery.

11 Claims, 1 Drawing Figure

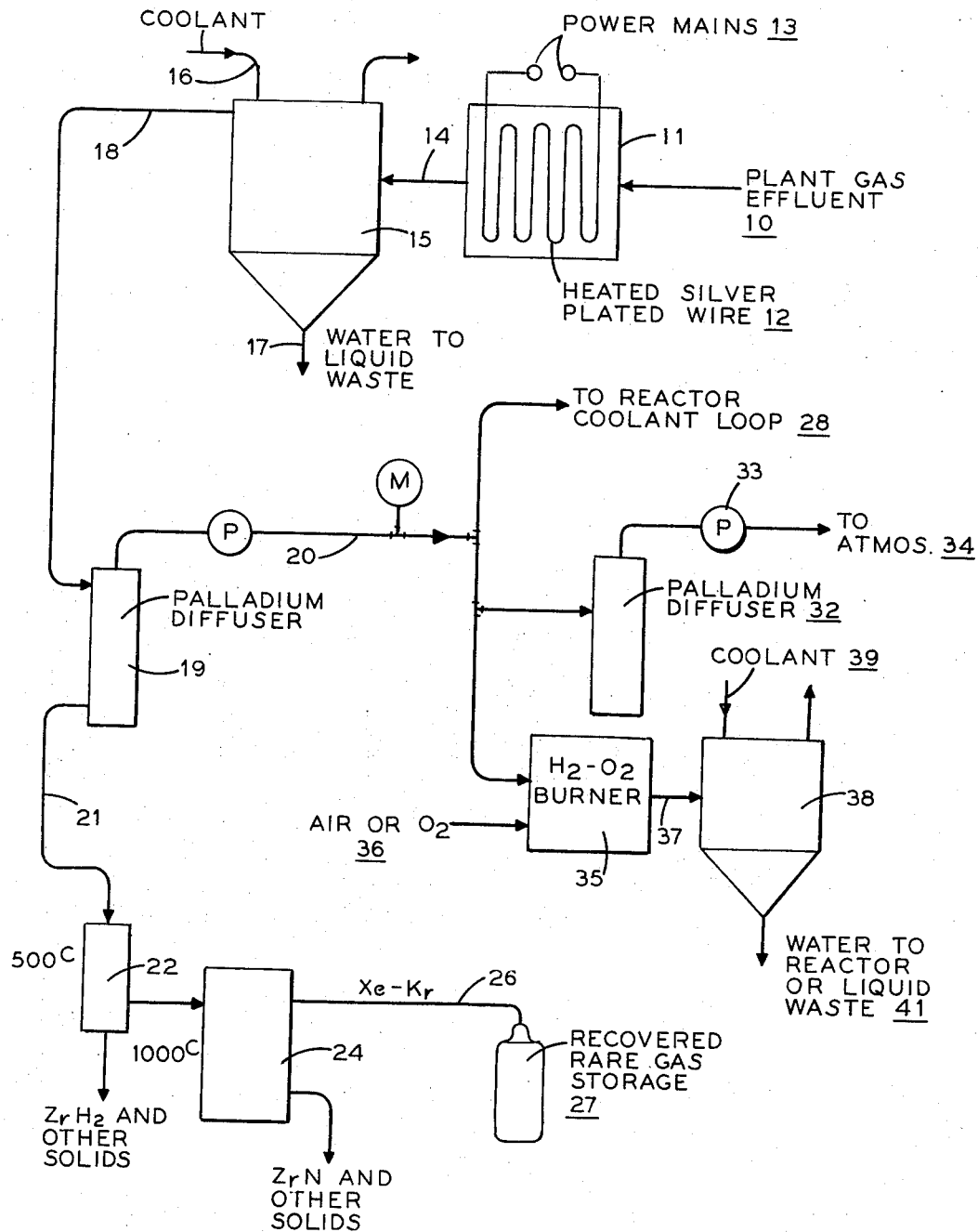

RECOVERY OF RADIOACTIVE NOBLE GASES FROM GASEOUS EFFLUENTS

This invention relates to a process of combating environmental pollution relative to gases of a radioactive nature.

More particularly, this invention relates to a process for the separation and recovery of xenon and krypton from the radioactive gaseous effluents of a power reactor of the nuclear variety.

The products of nuclear fission include isotopes of the rare gases such as zenon and krypton. In a pressurized-water reactor, these traces are dissolved in the primary coolant and eventually appear in the vapor spaces of the reactor. They are heavily diluted with other gases such as nitrogen and hydrogen which are added for various purposes. However, the radioactivity of xenon and krypton make venting of such gaseous mixture difficult, if not impossible, if the levels of radioactivity exceed the desired limit for plant effluent gas.

The classical method of recovering such rare gases from extremely dilute solutions of the same in hydrogen and nitrogen has been through the use of charcoal beds. Charcoal will adsorb and retain both xenon and krypton. The quantity adsorbed however is a strong function of temperature and is comparatively small for all temperatures above the critical temperature of the gases involved. The critical temperature of xenon is high enough that adsorption is strong even at ambient temperature but the critical temperature for krypton is −124°C. The only inexpensive coolant for this temperature region is liquid nitrogen which has a boiling point of −195°C. at one atmosphere of pressure. As a result of the fact that the critical temperature of nitrogen is so low, both nitrogen and krypton will be adsorbed by the charcoal bed. However, the separation of the latter two gases would require a method such as low-temperature chromatography which is extremely involved. Moreover, this technology is not straightforward and there are explosion hazards involved in the use of such charcoal beds at liquid nitrogen temperatures when radiation is present in large quantities.

Another approach takes advantage of the fact that rare gases such as those involved are more soluble in some liquid Freon compositions than is nitrogen. Cycling of the Freon between the liquid and vapor phase is used to reduce the rare gas content of a nitrogen stream. However, this is a relatively long and tedious process.

What is needed in the art is a process for the recovery of such radioactive rare gases which has ease of use over a wide variety of service conditions.

The subject invention answers the needs of the art with special emphasis on a process which will recover such radioactive rare gases in essentially pure form and permit their economic storage in gas cylinders at relatively low pressure.

It is therefore an object of this invention to provide a process for use in the substantial reduction of environmental pollution of a radioactive nature released as gaseous effluents from a nuclear power station.

Another object is to provide a process for isolating xenon and krypton from very large quantities of nitrogen and hydrogen, the more common diluent gases found in water reactors, as well as from the less abundant gaseous materials such as water vapor, hydrogen, halides, air and oxides of carbon and nitrogen.

A further object is to provide a process for use in the selective removal of contaminants from fission products such as xenon and krypton and to permit the economic storage of the latter.

A still further object is to provide a multi-stage system for the effective operations of any of the aforesaid processes having ease of use under a wide variety of service conditions.

Other objects and many of the attendant advantages of this invention will become more apparent to one skilled in the art from a reading of the following detailed description taken with the accompanying drawing wherein:

The FIGURE shows a flow diagram of a preferred embodiment of a system utilizing the present process.

In general, this invention consists in the initial dehalogenation and devaporization of the mixed gaseous effluents of the aforesaid power station, followed in sequence by the dehydrogenation and then the subsequent removal of residual gaseous contaminants from such effluents leaving the rare gases in substantially pure form.

More specifically, in the initial stage of the process, there must be control of the levels of material containing halogens such as iodine as well as control of the levels of water vapor contained in the gaseous effluent. These controls are essential for the prolonged operation of the second stage of the process which removes the bulk of the hydrogen gas from the effluents. The latter stage contains two palladium diffusers in operative series or in the alternative a palladium diffuser for the separation of hydrogen from the gaseous effluent in series with an oxidation unit for the conversion of such hydrogen to water. The third stage of the process contains a heated bed of chemically active metals for the removal of the bulk of any residual gas thereby leaving the rare gases in a substantially concentrated form for recovery.

For the process to be operative on a continuous basis, the pretreatment section of the system must control the levels of both the water vapor and the materials bearing iodine, each of which is contained in the gaseous effluent of a power reactor. This control is essential since both of these components will ultimately interfere with the subsequent separation of hydrogen from such effluents by diffusion through palladium and its alloys. In operation, this control is accomplished in sequence by initially passing the mixed gaseous effluents over heated silver-plated screens to remove such iodine and its compounds and then chilling the gas below the dew point of the water vapor.

The second section of the system is used to remove hydrogen from the gaseous mixture by passing the latter into a conventional palladium diffuser which consists of a thin wall tube of a palladium alloy heated to approximately 600°C. In practice, the gas mixture is introduced outside the tubing and follows a torturous path to the exit thereof. As a result, hydrogen present in the incoming gaseous mixture will diffuse through the tube walls and collect on the inside of the tube where it is continually pumped off.

Hydrogen is highly soluble and mobile in palladium at temperatures above about 300°C. Thus, hydrogen at a higher partial pressure on one side of a thin palladium barrier will diffuse to the other side of such barrier. Devices making use of this phenomenon are commercially available, however, iodine must be kept to a very low level since it destroys the permeability of the barrier. Also the palladium surface must be maintained above 300°C, since at lower temperatures, the barrier will undergo chemical attack by hydrogen and its physical properties will be destroyed.

In the third stage of the process, the gaseous mixture is received in the hydrogen depleted state and contains mostly nitrogen. In this stage, the gaseous mixture is introduced to a heated bed of chemically active metals in the form of small chips to provide a relatively large surface area. The metallic chips may be selected from any of a large group of chemically active metals which react rapidly with volatile chemical compounds and include the rare earth metals and magnesium, barium, strontium, calcium, uranium, titanium, zirconium, hafnium. Highly satisfactory results are achieved when zircaloy chips and turnings are used. In conventional nuclear fuel manufacture, large quantities of zircaloy scrap are produced and have been uneconomical to recover but now may be used to reduce the volume of radioactive rare gases in gaseous effluent to a point where prolonged storage is economically practical.

The hydrogen recovered from the second stage of the process may be recycled back to the primary system for reuse without further chemical treatment. In another alternative, it may also be released to the atmosphere after treatment as hydrogen gas or water vapor. The radioactivity of such gaseous material should be checked prior to release to be sure that a defect of the primary diffuser did not compromise the purity of the hydrogen. Accordingly, the hydrogen should be compressed to several atmospheres of pressure for monitoring with gamma radiation detectors sensitive to the radiation of krypton - 85. Again, after monitoring, the hydrogen may also be vented to atmosphere in normal operation or passed through a burner. However, a leak of significant size in the primary diffuser could require shutdown of the burner and contaminated hydrogen would accumulate as a result. In another alternative, the recovered hydrogen gas can be vented continuously through a second palladium diffuser for the rejection of any rare gas contaminations which has leaked through the primary diffuser. In this way, if the primary diffuser is damaged, repairs can be postponed until a scheduled shutdown. In a further alternative, hydrogen could be recovered as water for offsite disposal or return to the reactor. In this manner, the amount of tritium released to the atmosphere is reduced. Since the latter is a hydrogen isotope, the diffusers will pass some portion of it along with other forms of hydrogen and if the levels of tritium exceed those desired for plant effluents, it may be desirable to oxidize the hydrogen under controlled conditions and to recover the water produced.

In the preferred embodiment, referring to the FIGURE, the plant gas effluent 10 is introduced in a dehalogenation section 11 having heated silver plated wires 12 connected to power mains 13 wherein the iodine is removed from the gaseous mixture. After treatment, dehalogenated gas mixture 14 is then introduced into a devaporization section 15 provided with conventional circuit of conduits through which a coolant 16 flows and such gaseous mixture is devaporized to produce water 17 which may be directed to the liquid waste reservoir of the system. The resulting devaporized gaseous mixture 18 is then introduced into a palladium diffuser 19 for the substantial removal of hydrogen from the gaseous mixture as heretofore described. Any residual hydrogen that may be remaining in the treated gaseous mixture 21 is removed by passing such mixture through a bed 22 of zirconium in the form of zircaloy chips which has been heated to a temperature in the range of about 300°C to 500°C. Such treatment removes hydrogen, as $ZrH_2$, as well as any remaining $CO_2$ and water vapor. The hydrogen-free gaseous mixture is then passed through a second bed 24 of zirconium, which has been heated to a thermal zone of about 1000°C, wherein nitrogen is absorbed and the process is completed, leaving only the rare gases 26 to be recovered and stored in a very small volume container 27.

As noted in the FIGURE, the hydrogen gas 20 recovered from the palladium diffuser 19 can be passed under pressure in one of three directions. The first direction would be to the reactor coolant loop 28. The second direction could be to a second diffuser 32 which would reject any residual rare gas. The hydrogen exhaust of such diffuser 32 could be monitored and then directed under pressure 33 to the atmosphere 34. The third direction could be to a burner 35 into which is introduced air or oxygen 36 for the subsequent oxidation of the hydrogen gas followed by transfer of such heated gaseous mixture 37 into a cooling section 38 provided with circuit for the flow of coolant 39 to produce water 41 for subsequent transfer to the reactor or liquid waste reservoir.

The aforesaid system for the use of the process of this invention offers a strong technical advantage over the art. In experimental tests, the diffusers were shown to produce a decontamination factor of at least $10^{12}$ in the separation of hydrogen from krypton. In fact, krypton was below the detection limit in the purified hydrogen and for all practical purposes, the separation of hydrogen from all other gases was absolute. However, if needed, the fraction of hydrogen removed from the input gas can be varied by adjustment in the parameters of the diffuser such as available surface, operating temperature, and turbulence induced in the mixed gas. Moreover, the chemically active metal beds are absolute separators of all gases from the rare gas constituents because they react with all gases except the rare gases and are totally inert towards the latter. In this section of the system, the separation efficiency is limited only by available metal mass and contact time.

What is claimed is:

1. A process of recovering radioactive noble gases from the halogenous, water and nitrogenous gaseous effluents of a nuclear power reactor comprising Initially dehalogenating said gaseous effluent with heated silver, Devaporizing water from said dehalogenated effluent by cooling, Dehydrogenating said devaporized effluent with a palladium diffuser, Removing residual hydrogen from said dehydrogenated effluent with zirconium heated to a temperature in the range of about 300°C to 500°C, Then, denitrogenating said effluent with heated metals, and Finally, recovering and storing said noble gases.

2. The process of claim 1 wherein said denitrogenation step is conducted with a heated bed of metals selected from the group of metals consisting of rare earth metals, magnesium, barium, strontium, calcium, uranium, titanium, zirconium, and hafnium.

3. The process of claim 2 wherein said denitrogenation is accomplished with a bed of zirconium heated to 1000°C.

4. The process of claim 1 wherein the hydrogen from the dehydrogenation stage is passed under pressure from the palladium diffuser to the coolant loop of said reactor.

5. The process of claim 1 wherein the hydrogen from the dehydrogenation stage is passed to a second palladium diffuser for the removal of residual noble gases and then venting said hydrogen to the atmosphere as hydrogen gas.

6. The process of claim 1 wherein the hydrogen from the dehydrogenation stage is passed through a catalytic oxidation unit to form water vapor which is then cooled and condensed to liquid water.

7. A system for the selective recovery of radioactive noble gases from the mixed gaseous effluents of a nuclear power station that contain halogenous, water, hydrogenous, and nitrogenous gases, comprising, in series, dehalogenation means having heated silver wires for contact with said mixed gaseous effluent which pass therethrough from said power station, devaporization means having a cooling circuit for use in chilling the dehalogenated gaseous mixture received therein from said dehalogenation means to remove water vapor, dehydrogenation means having a palladium diffuser for the substantial removal of hydrogen from the devaporized gaseous mixture passed therethrough from said devaporization means, Another dehydrogenation means having a heated zirconium bed in the temperature range of about 300°C to 500°C for the removal of the residual hydrogen in said gaseous mixture passed therethrough from said palladium diffuser dehydrogenation means, purification means having a heated zirconium bed at a temperature above about 1000°C for the denitrogenation and removal of all residual gases except the noble gases from the gaseous mixture passed therethrough from said another dehydrogenation means, and, further means having a container for the recovery and storage of said noble gases under pressure.

8. The system of claim 7 further comprising means for conducting water from said devaporization station to liquid waste.

9. The system of claim 7 comprising means for conducting said hydrogen from said palladium diffuser under pressure to the reactor coolant loop of said power station.

10. The system of claim 7 comprising a second palladium diffuser through which said hydrogen from said palladium diffuser is passed for the removal of residual radioactive rare gases and the subsequent venting of the hydrogen to the atmosphere.

11. The system of claim 7 comprising means for catalytically oxidizing said hydrogen from said palladium diffuser and further means for chilling said oxidized hydrogen to produce water.

* * * * *